July 14, 1964 T. G. HART 3,141,100
PIEZOELECTRIC RESONANCE DEVICE
Filed June 21, 1962 8 Sheets-Sheet 1

THOMAS G. HART
*INVENTOR.*

BY Alden D. Redfield
Melvin E. Frederick
ATTORNEYS

July 14, 1964 T. G. HART 3,141,100
PIEZOELECTRIC RESONANCE DEVICE
Filed June 21, 1962 8 Sheets-Sheet 2
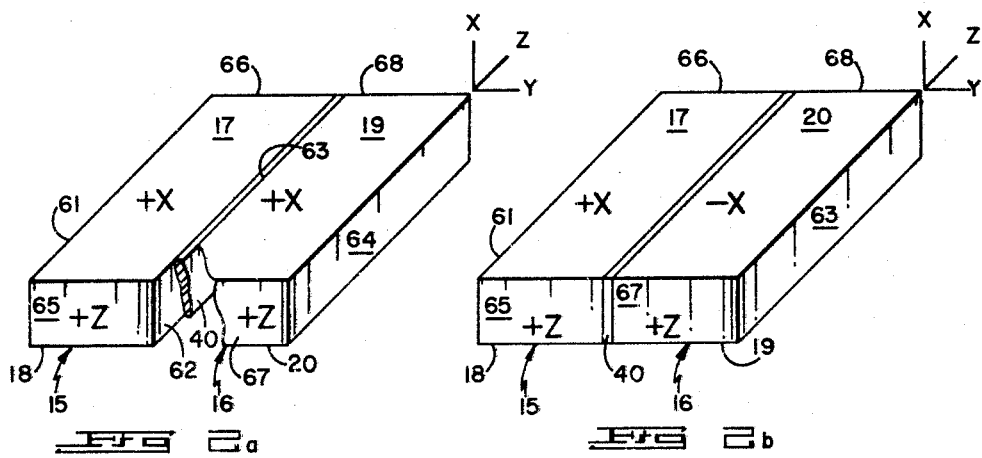
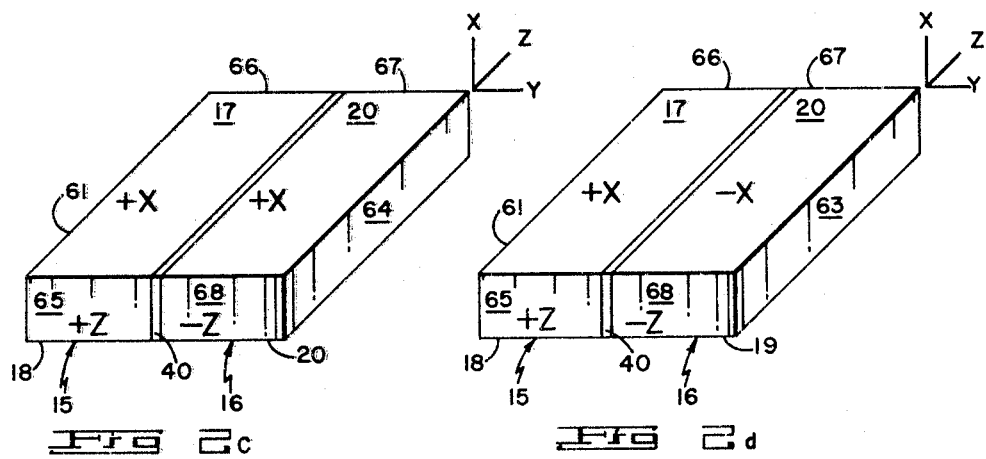
THOMAS G. HART
*INVENTOR.*
BY Alden D. Redfield
Melvin E. Frederick
ATTORNEYS July 14, 1964     T. G. HART     3,141,100
PIEZOELECTRIC RESONANCE DEVICE Filed June 21, 1962     8 Sheets-Sheet 3

THOMAS G. HART
*INVENTOR.*

BY Aden D. Redfield
Melvin E. Frederick
ATTORNEYS

THOMAS G. HART
INVENTOR.

BY Alden D. Redfield
Melvin E. Frederick
ATTORNEYS

July 14, 1964

T. G. HART 3,141,100

PIEZOELECTRIC RESONANCE DEVICE

Filed June 21, 1962

THOMAS G HART
*INVENTOR.*

BY Alden D. Redfield
Melvin E. Frederick
ATTORNEYS

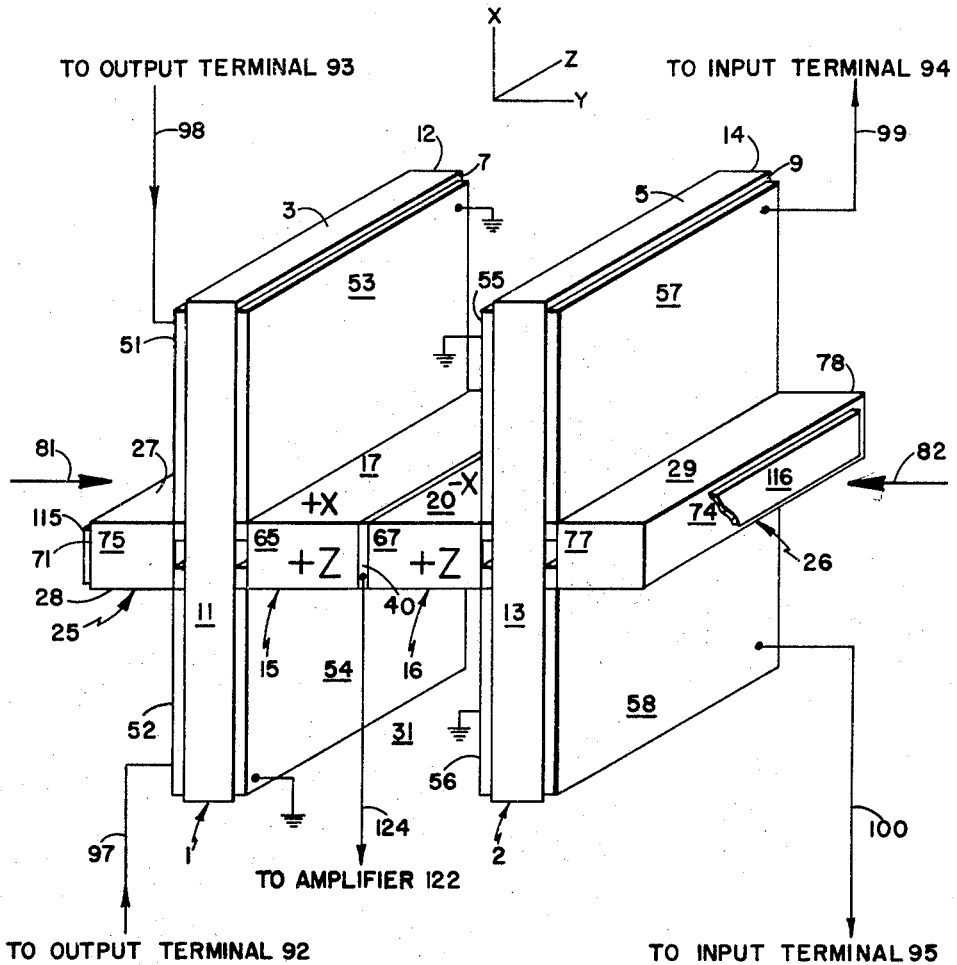

July 14, 1964 T. G. HART 3,141,100
PIEZOELECTRIC RESONANCE DEVICE
Filed June 21, 1962 8 Sheets-Sheet 7

DRIVING VOLTAGE AT ELECTRODE 51

DRIVING VOLTAGE AT ELECTRODE 53

VOLTAGE AT ELECTRODE 40 FOR CLOCKWISE ROTATION

VOLTAGE AT ELECTRODE 40 FOR ANTI-CLOCKWISE ROTATION

THOMAS G. HART
INVENTOR.

BY Alden D. Redfield
Melvin E. Frederick
ATTORNEYS

July 14, 1964 T. G. HART 3,141,100
PIEZOELECTRIC RESONANCE DEVICE
Filed June 21, 1962 8 Sheets-Sheet 8

THOMAS G. HART
*INVENTOR.*

BY Alden D. Redfield
Melvin E. Frederick
ATTORNEYS

United States Patent Office 3,141,100
Patented July 14, 1964

3,141,100
PIEZOELECTRIC RESONANCE DEVICE
Thomas Gordon Hart, West Acton, Mass., assignor to Avco Corporation, Cincinnati, Ohio, a corporation of Delaware
Filed June 21, 1962, Ser. No. 204,196
20 Claims. (Cl. 310—8.6)

The present invention relates to piezoelectric resonance devices, and more particularly to mechanical resonance devices comprised of a plurality of intimately connected crystal quartz elements.

Any mechanical structure whatsoever may be excited into a great number of different types of vibrational movement. In general, the way in which a typical structure will vibrate in response to a particular excitation depends only to a small degree upon the form of the excitation and to a large degree upon the elastic properties, the inertial properties, and the geometrical configuration of the structure. A structure excited into vibration by any suitable means can persist in vibration after the exciting means is withdrawn. The nature of self-sustaining vibration of a structure, commonly termed "resonant vibration," is such that were the structure unconstrained and free of frictional losses, then the vibration, once excited, would persist indefinitely. Any resonant vibrational movement of such a structure, is, once promoted, substantially influenced only by inertial rotation of the structure and, in certain circumstances, by inertial acceleration.

One way of visualizing a resonant vibratory condition in a mechanical structure is in terms of energy, composed of elastic energy and movement energy, recurrently changing in form from one to the other and thereby self-sufficiently sustaining a recurrent movement of the structure. In these energy terms, the conditions for resonant vibration are met by any movement and accompanying elastic stress of the structure which together provides a constant total energy, total energy being defined as the sum of the elastic energy and the movement energy. In the general case, the resonance conditions may be met by a large number of different movements having different frequencies of recurrency, the resonant movement having the lowest frequency being termed the "fundamental resonant mode."

From the above it will be readily seen that in designing a structure for the purpose of sustaining a particular nature of resonant vibration one must provide an appropriate combination of elastic, inertial, and configurational properties in the structure. However, resonance properties, once provided, are far too easily degraded by, for example, the necessity in a practical device to mount and thereby constrain the structure. Accordingly, in designing a resonant structure for practical use it is not sufficient merely to provide that within the structure the appropriate resonance exists, it being equally important to insure that the resonance is conveniently excited and that both the structure and its resonance are such that energy is not substantially coupled out of the structure by a rigid mounting. In practice, the above-noted design objectives are, in combination, extremely difficult to accomplish as is attested by the wealth of patents which purport to improve frequency control devices. The design problems are further compounded if it is necessary to minimize frictional losses and to provide means within a resonant structure for coupling out energy such, for example, as may be released from the resonance energy by inertial movement of the structure.

Piezoelectric resonance devices in accordance with the present invention have a generally H configuration and typically include a parallel pair of quartz crystal prismatic members having rectangular end faces and quartz crystal means interconnecting the prismatic members. The prismatic members and the quartz crystal connecting means in combination support a resonant vibratory condition wherein the unconstrained portions of the prismatic members are in substantially balanced flexural motion, and the connecting means is normally subjected to substantially only compressional and extensional forces. Electrodes are provided on surfaces (either the same and/or different surfaces) of the structure for piezoelectrically coupling energy into the device, to sustain the resonant vibratory condition, and for piezoelectrically coupling energy out of the device. Energy may be coupled into and out of the structure via the electrodes for a wide variety of purposes.

Mechanical resonance structures in accordance with the present invention are capable of satisfying all of the requirements previously mentioned. The present invention has excellent resonance qualities not substantially degraded by rigid mounting, very low frictional losses, and a conveniently excited fundamental mode. As will become readily apparent hereinafter, the present invention has broadly useful properties. By way of example, and not of limitation, these properties are useful for frequency control, frequency transmission, and inertial motion sensing. Further, the form of the present invention and the nature of its fundamental resonance allow energies released from the resonance energy by inertial rotation and inertial acceleration to be coupled out of the structure independently.

Broadly speaking, the choice, in some cases singly and in other cases in combination, of: electrodes and their disposition; orientation with respect to the crystal axes of the members; and the relative polarity of the individual members with respect to each other determines the purpose or purposes for which the device may be used. The present invention may comprise a single-purpose device or a multipurpose device that may be used either for a single purpose or simultaneously for a range of different purposes.

An important aspect of the present invention distinguishing it from prior art devices, is that it inherently possesses characteristics that allow a single device to be used for widely different purposes. Whereas resonance devices of similar configuration per se have long been used for specific purposes, such devices have not hitherto been constructed from a plurality of separate crystal quartz members. Mainly for this reason, it has not heretofore been appreciated that a resonance structure in accordance with the present invention as disclosed herein would allow multipurpose use of a single device. The versatility of the present invention is also partly due to the piezoelectric character of the entire structure which allows energy to be coupled into and out of the device by a variety of electrode dispositions and configurations. The features which lead to the versatility of the present invention taken either alone or in combination fundamentally distinguish it from prior art devices.

In most embodiments of the present invention, only associated electronics and electrode disposition and configuration need be modified or selected to meet a range of uses while the basic device remains unchanged. Thus, the present invention may be used in a frequency control device, for example, to accurately and dependably control a frequency of 2000 cycles per second. Prior art quartz crystal devices capable of controlling such low frequencies are flimsy and delicate in form and, therefore, are unsuited to broad use, whereas metallic tuning fork devices commonly used for controlling such frequency are relatively complicated devices. If desired, the present invention may be used in an electrical transmission filter designed, for example, to pass only selected frequencies or a selected band of frequencies. On the other hand, and in addition to the above uses, the present invention may be used to sense rotation or to sense linear acceleration.

In view of the foregoing, it will be apparent that it is a broad object of the present invention to provide a new and improved mechanical resonance device.

Another broad object of the present invention is to provide a multipurpose mechanical resonance device.

Another object of the present invention is to provide a mechanical resonance device not substantially degraded by its mounting structure.

A further object of the present invention is to provide a mechanical resonance device that is conveniently excited and wherein energy is not substantially coupled out of the structure by rigid mounting.

A still further object of the present invention is to provide a mechanical resonance device which may be easily excited, which may be rigidly mounted without significant degradation of its resonance properties, which has low internal losses, and from which energy, released from the resonance energy, by inertia movement of the device, may be obtained.

A still further object of the present invention is to avoid disadvantages of known apparatus for measuring inertial movement by the provision of apparatus characterized by lightweight, relatively small space requirements, low cost, and simplicity coupled with high reliability and accuracy.

Another object of the present invention is to provide an essentially piezoelectric device for measuring inertial movement of a vehicle.

A still further object of the present invention is to provide a crystal quartz device with characteristics allowing multipurpose use of a single device wherein only minor modification is needed to adapt the device to a wide range of uses.

Other specific objects of the present invention are as follows:

(a) Provision of a mechanical resonance device;

(b) Provision of a device for sensing inertial movement, having a power consumption of about one watt and a "warm-up time" of about five seconds;

(c) Provision of a device for sensing a broad magnitude and frequency range of inertial movement;

(d) Provision of a device that is linear over a broad range for sensing inertial movement;

(e) Provision of a device that is not easily overloaded even by very high rates of inertial movement;

(f) Provision of a device that is insensitive to linear acceleration for sensing inertial rotation; and (g) Provision of a device that is sensitive to inertial rotation only about one axis and substantially insensitive to rotation about the other two axes.

The novel features that are characteristic of the invention are set forth in the appended claims; the invention itself, however, both as to its organization and method of operation, together with additional objects and advantages thereof, will best be understood from the following desecription of specific embodiments when read in conjunction with the accompanying drawings, in which:

FIGURE 1 is a simplified perspective view, with parts broken away, of a mechanical resonance structure in accordance with the present invention;

FIGURES 2a, b, c and d are perspective views illustrating various polarity arrangements of the members;

FIGURE 3 is a perspective view with the members in phantom to more clearly illustrate the disposition of electrodes on the surfaces of the structure;

FIGURE 6 is a simplified perspective view of the structure for detecting inertial rotation;

Figure 1:
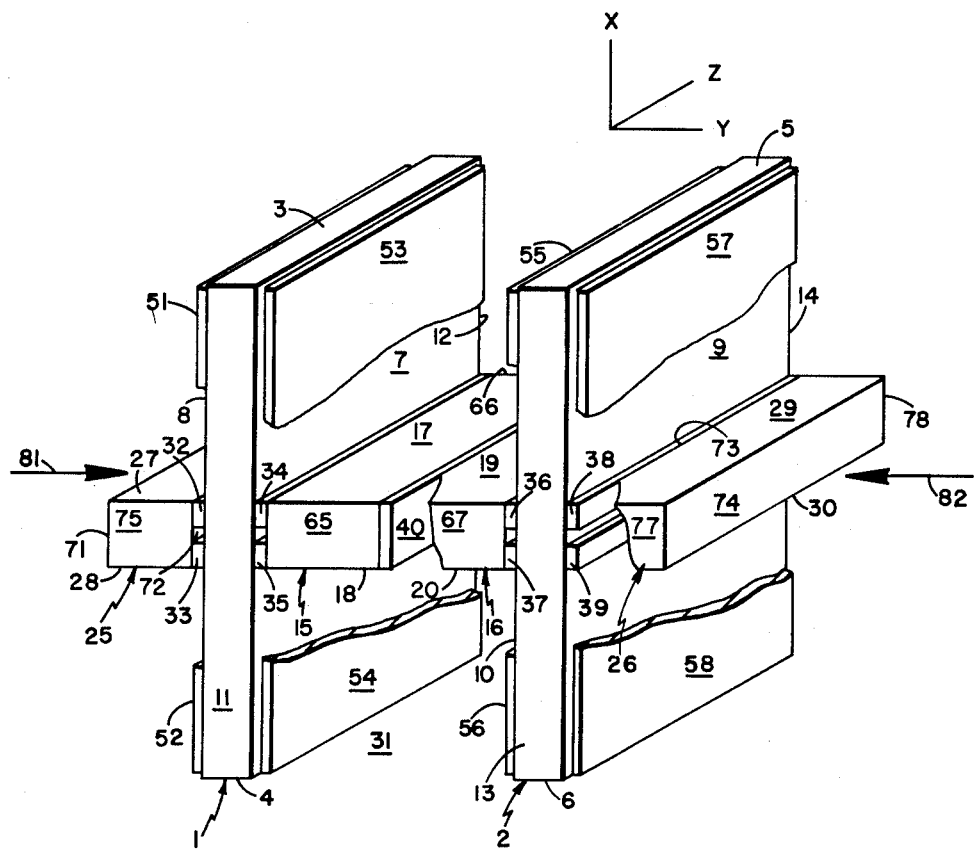

Referring now to FIGURE 1, there are shown two elongated and substantially identical crystal quartz prismatic members 1 and 2, each having, respectively, rectangular end faces 3, 4 and 5, 6; rectangular major side faces 7, 8 and 9, 10; and rectangular minor side faces 11, 12 and 13, 14. The prismatic members 1 and 2 are in parallel and opposite relationship with respect to the major side faces. The prismatic members 1 and 2, which may be conveniently referred to as energy storage members, are maintained in position by two substantially identical crystal prismatic members 15 and 16, having, respectively, rectangular end faces 17, 18 and 19, 20 and two substantially identical outer crystal quartz prismatic members 25 and 26 having, respectively, rectangular end faces 27, 28 and 29, 30. The crystal quartz members 1, 2, 15, 16, 25 and 26 in combination form a rigid symmetrical structure, designated generally by the numeral 31, in which the ends of the energy storage members 1 and 2 are capable of flexural movements and the center portions of the energy storage members are capable of movement only insofar as members 15, 16, 25 and 26 are capable of movement. By reason of the constraining effect of members 15, 16, 25 and 26 upon the center portions of the energy storage members 1 and 2, the former members may conveniently be referred to as constraining means. Generally, the members 15, 16, 25 and 26 will be in abutting relationship with the energy storage members 1 and 2 substantially equidistant from the ends of said energy storage members. The individual members 1, 2, 15, 16, 25 and 26 are connected together so as to form a rigid structure by thin, fused, metallic interlayers 32–40 disposed between and in firm adherence with the abutting surfaces of the various members, as indicated in FIGURE 1. The metallic interlayers, shown greatly thickened for purposes of illustration, may be formed by depositing a suitable thin layer of metal on each surface to be joined and after the structure has been assembled, applying sufficient heat to fuse the layers together. As will become evident hereinafter, the metallic interlayers may form part of thin, metal electrodes 51–58, and for this reason, two metallic interlayers separated by a narrow gap are shown at each pair of abutting surfaces. Where separation of electrodes would not be affected, a one-piece metallic interlayer between two abutting surfaces may be used, as for example, interlayer 40.

The inner members 15 and 16 of the constraining means have, respectively, end faces 17, 18 and 19, 20 (only end faces 17 and 19 are visible) parallel with the end faces of the energy storage members; major side faces 61–64 (none of which is visible, see FIGURES 2a–d) parallel with the major side faces of the energy storage members; and minor side faces 65–68 (only minor side faces 65 and 67 are visible) parallel with the minor side faces of the energy storage members.

In similar manner, the outer members 25 and 26 of the constraining means have, respectivley, end faces 27, 28 and 29, 30 (only end faces 27 and 29 are visible); major side faces 71–74 (only the major side face 74 is visible); and minor side faces 75–78 (only minor side faces 75 and 77 are visible). Thus, the end faces, major side faces and minor side faces of all of the members comprising both the constraining means and the energy storage members are, respectively, parallel one with another.

All of the members preferably are fabricated from crystal quartz of the same handedness (either all left or all right) and in the case that the crystal axes are normal to the faces of the members, the members are assembled so that the quartz crystal axes direction of all members are respectively parallel throughout the structure 31. Accordingly, the directions of the three crystal axes of all the members in the structure disclosed in FIGURE 1 are represented by axes X, Y, and Z. Thus, as illustrated in FIGURE 1, the crystal X axis, commonly termed the electrical axis, is substantially normal to the end faces of all of the members and the crystal Z axis, commonly termed the optic axis, is substantially normal to the minor side faces of all the members. Since the crystal Y axis is normal to both the X and the Z axes, the crystal Y axis is normal to the major side faces of the members. Whereas it is preferable that all members have identical orientation with respect to the crystal axes, it is not necessary that the crystal axes be normal to the faces of the members and, in fact, in certain circumstances it may even be desirable that the crytsal axes are not normal to the faces of the members. As used herein, the term "orientation" means the angular relationship between the member faces and the crystal axes. Commonly, the orientation is specified in terms of three angles. For example, certain advantages may be gained by angling the Y axis and, therefore, the Z axis to the side faces while maintaining the X axis normal to the end faces. Again, the Y axis may be normal to the end faces with the X axis and the Z axis angled to the side faces.

It will be noted from the foregoing that in the case that the crystal axes are normal to the faces of the members, the coefficients of expansion will match at abutting faces in the structure, whatever the relative polarities with respect to the crystal axes of the individual members, so long as the members are assembled with their crystal axes' directions parallel. Assuming now that polarities be assigned to each member, thereby defining a +X, −X, +Y, −Y, +Z, and a −Z face on each member, in accordance with the sense of the crystal axis normal or most nearly normal to the face, in general a number of alternative arrangements of the members with respect to positive and negative faces will equally satisfy the condition that the coefficients of expansion match at abutting faces. By way of example, four such arrangements of the members 15 and 16 are shown in FIGURES 2a, 2b, 2c, and 2d.

As shown in FIGURE 2a, the upper end faces 17 and 19 of members 15 and 16 are both +X faces and the visible minor side faces 65 and 67 are both +Z faces. The orientation of the members 15 and 16 with respect to the crystal axes is as illustrated in FIGURE 1 and is indicated by axes X, Y, and Z. A portion of member 16 and metallic interlayer 40 in FIGURE 2a is shown broken away to expose major side face 62.

As compared to member 16 of FIGURE 2a: in FIGURE 2b member 16 has been rotated 180° about the Z axis; in FIGURE 2c member 16 has been rotated 180° about the X axis; and in FIGURE 2d member 16 has been rotated 180° about both the Z axis and the X axis. The preceding discussion of the different polarity arrangements applies equally to members 1, 2, 25 and 26. Thus, in general a large number of arrangements of the six members, each arrangement different in terms of relative polarity of the members, is possible.

Attention is now directed to FIGURE 3 which more clearly illustrates the electrode arrangement shown in FIGURE 1. In FIGURE 3 the members are shown in phantom. The electrodes 51–58 and metallic interlayer 40, which may also serve as an electrode, may be of any suitable metal or metal alloy and may be deposited on the faces of the members in conventional manner, as, for example, by vacuum evaporation methods well known in the quartz crystal art. The electrodes serve as the means whereby electrical energy is supplied to and/or removed from the structure, as more fully described hereinafter. The structure is typically mounted by means of a clamp-type arrangement, bearing onto the outer major faces 71 and 74 of the outer members 25 and 26, represented in FIGURES 1, 3–7, and 12 by arrows 81, 82. A typical mounting arrangement is shown in FIGURE 13.

Figure 4:
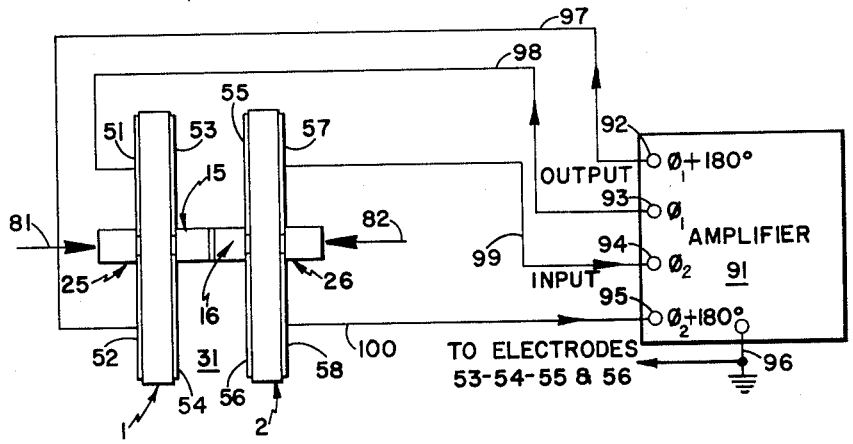
FIGURE 4 is a diagrammatic end view illustrating one electrode arrangement by means of which the structure may be sustained in its fundamental flexural mode.

When the structure 31 is suitably excited by electrical means, as shown for example in FIGURE 4 the energy storage members and the constraining means in combination will sustain a resonance vibratory condition wherein the end portions of the energy storage members are in substantially balanced flexural motion and the constraining means is subject to substantially only compressional and extensional forces. The lowest frequency of resonance of the structure is accordingly characterized by the simplest type of balanced flexural movement of the end portions of the energy storage members, and this mode of resonant vibration is therefore termed "the fundamental flexural mode." In the simplest type of balanced flexural movement the opposed ends portions of the energy storage members are, alternatively, simultaneously moving toward each other or simultaneously moving away from each other.

It will be apparent that if the energy storage members were to be unsymmetrically disposed in the structure or were to be different from one another in configuration, then a balanced flexural motion of the end portions and a corresponding resonant mode of the structure would likely be impossible. In such a case, even if some sort of resonance were possible, then because of unbalanced movement of the energy storage members, the constraining means would likely be subjected to forces in addition to the compressional and extensional forces present in a balanced structure. The fact that substantially only compressional and extensional forces exist on the constraining means is important in connection with the use of the structure for detecting inertial motion.

In general, a fundamental flexural mode of the structure capable of being sustained by electrical means would be provided were the orientation, dimensioning, and arrangement of the members to be such as to allow completely balanced flexural movement of the end portions of the energy storage members. Hence, by way of example and not of limitation, it will be noted that a crystal structure, having a balanced fundamental flexural resonant mode which can be electrically maintained, may be simply and dependably obtained in the manner of FIGURE 1 by: making the end faces of all members substantially normal to the crystal X axis; the major side faces of all the members normal to the crystal Y axis; substantially matching the dimensions of the energy storage members; providing a substantially symmetrical arrangement of the energy storage members; matching the members comprising the constraining means in at least those dimensions which affect the symmetrical arrangement of the energy storage members; and providing suitable electrodes on the surfaces of one or more of the members.

Attention is now directed to FIGURE 4 which diagrammatically illustrates one of several electrode arrangements that may be used to sustain the structure in the fundamental flexural mode. Should the arrangement of FIGURE 4 be used merely as a frequency reference device, the polarity of members with respect to one another may be arbitrarily chosen and, for this reason, relative polarity of the members is not indicated in FIGURE 4. As shown in FIGURE 4, electrical energy is coupled into the structure via electrodes 51–54 on the major side faces of energy storage member 1, and electrical energy is coupled out of the structure via electrodes 55–58 on the major side faces of energy storage member 2. This arrangement may of course be reversed if desired. There is provided a conventional amplifier designated generally by the numeral 91 having output terminals 92, 93, input terminals 94, 95, and a common ground 96. Amplifier 91 is coupled to the electrodes 51–58 by conductors 97–100 and the common ground 96 to provide a closed loop through the structure 31. The output terminals 92 and 93 provide with respect to ground two voltages 180° out of phase. Output terminal 92 connected to electrode 52 via conductor 97, output terminal 93 connected to electrode 51 via conductor 98, and electrodes 53 and 54 connected to the common ground 96 comprise the output portion of the closed loop. The input portion (to amplifier 91) of the closed loop is comprised of the ipnut terminals 94 and 95 which are connected to electrodes 57 and 58 via, respectively, conductors 99 and 100, electrodes 55 and 56 also being connected to the common ground 96. The voltages on conductors 99 and 100 are 180° out of phase.

By appropriate control of the phase and amplitude of the amplifier voltages, in a conventional manner, a closed loop condition is sustained whereby the frequency of the alternating voltage appearing across the terminals of the amplifier is determined by the mechanical resonance of the structure 31. Inasmuch as the frequency of the fundamental flexural mode of the structure 31 is itself precisely determined by the extremely stable mechanical aspects of the structure 31, the electrical frequency is held precisely constant.

By way of example: a structure of the type of FIGURE 1, used in the combination of FIGURE 4 has been reduced to practice to provide a stable frequency source of 5,000 cycles per second. In this embodiment, energy storage members 1 and 2 are about 1¾" long, ½" wide, and 3/32" thick and constraining members 15, 16, 25, and 26 are about ½" by ¼" by ¼". The complete combination is contained in a single enclosure of size 1¼" long by 2" diameter and has a power consumption of about ½ watt.

A factor in the temperature stability of the resonant frequency of the structure 31 is the orientation of the members with respect to the quartz crystal axes. A very low temperature coefficient of frequency of the fundamental flexural mode is obtained, for example, by members having an orientation such that the quartz crystal X axis is normal to the end faces and the quartz crystal Y axis is at an angle of between 25° and 35° to the major side faces ( see FIGURE 5). Further, the members 15 and 16 may be made integral if desired.

Figure 5:
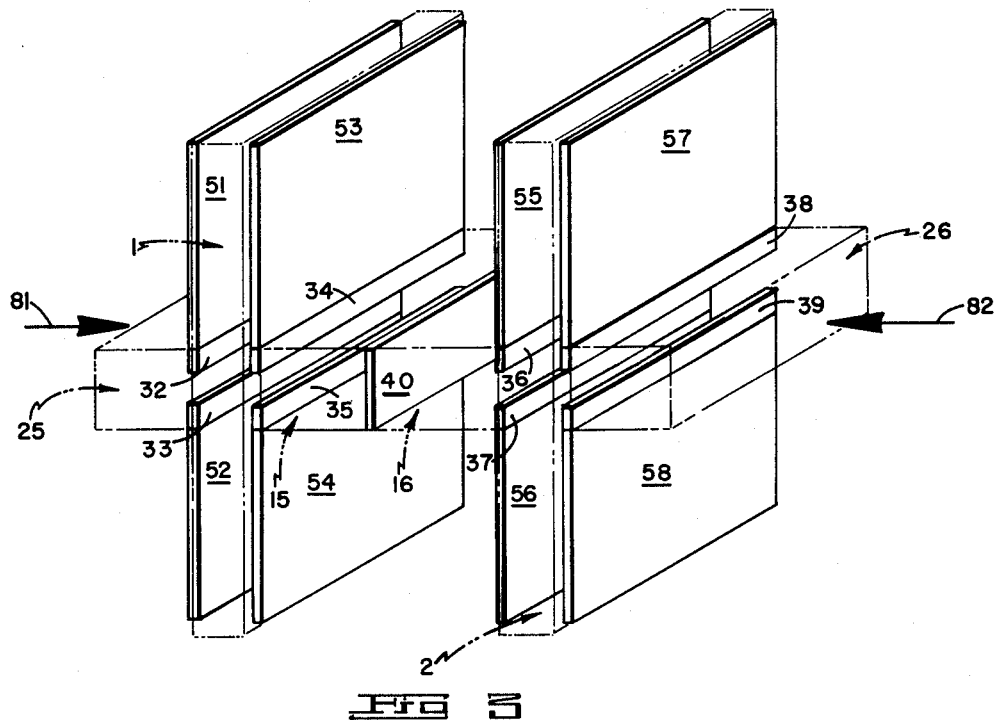
FIGURE 5 is a perspective view showing an alternative arrangement of electrodes for exciting the structure.

The fundamental flexural mode may be sustained by means other than those described in connection with FIGURE 4. For example, an alternative disposition of electrodes for coupling electrical energy into and out of the structure 31 to maintain the fundamental flexural mode is shown in FIGURE 5. As shown in FIGURE 5, there are additional electrodes 105 and 106 on the end faces of member 25 and additional electrodes 107 and 108 on the end faces of member 26. Electrodes 106 and 108 may be connected to the common ground 96, and the aforementioned electrodes 105 and 107 may be connected to, respectively, the output and input terminals of a suitable amplifier much as in the manner shown in FIGURE 4. As a still further alternative, additional electrodes 111 and 112 on the end faces of the inner member 15 and electrodes 113 and 114 on the end faces of the inner member 16 may be used in the same manner as electrodes 105–108. It will be noted that in both these cases electrodes on the constraining means are utilized rather than electrodes on the energy storage means.

The preceding discussion illustrates that in general electrical energy may be supplied to and extracted from the structure 31 in order, for example, to maintain a resonant vibration of the structure via a variety of electrode dispositions and configurations. The choice of a particular electrode disposition and configuration depends only upon there being some appropirate measure of piezoelectric coupling and, for this reason, may be determined largely as a matter of convenience from the point of view of ease of connection and amplifier characteristics. Accordingly, the choice of electrode disposition and configuration is rarely unique since there is in every case a number of roughly equivalent alternatives.

It has previously been noted that the resonance of a structure is affected by inertial movement of the structure, and it has also been noted that it is a little more than somewhat difficult to provide simple and reliable means for coupling out energy released from the resonance energy by inertial movement; the coupled energy may be used for purposes of measuring the inertial movement.

Consider now FIGURE 6 which shows an embodiment of the present invention which, in addition to being useful for detecting inertial rotation, is also useful for other purposes, including those previously described. The discussions relating to the structure of FIGURE 1 apply equally to the structure of FIGURE 6, except as noted hereinafter. In the following discussion the structure 31 of FIGURE 6 will be assumed to be maintained in the fundamental flexural mode in the manner illustrated in FIGURE 4.

It has previously been indicated that, for purposes of frequency control and the like, the relative polarity of members 15 and 16 is arbitrary and that they may be replaced by a single crystal quartz member if desired, thereby eliminating the metallic interlayer 40. However, for purposes of the embodiment now to be described wherein the structure is used for detecting inertial rotation, the relative polarity of the members 15 and 16 is not arbitrarily chosen and is accordingly shown in FIGURE 6. The relative polarity of members 1, 2, 25, and 26 may be arbitrarily chosen and is accordingly not indicated in FIGURE 6. The polarity of the end faces of inner members 15 and 16 is opposed as indicated in FIGURE 6, the upper end face of member 15 being shown as a +X face and the upper end face of inner member 16 being shown as a —X face. This arrangement may be reversed if desired.

When the structure 31 of FIGURE 6 is sustained in the fundamental fluxural mode, as for example in the manner illustrated in FIGURE 4, then in the absence of inertial rotation only compressional and extensional forces act upon the inner members 15 and 16. In this case the voltage appearing at electrode 40 is zero, due to the orientation of members 15 and 16 with respect to the X axis. However, when structure 31 of FIGURE 6 is rotated about an axis normal to the minor side faces, alternating shear forces acting in the X axis direction are produced on the members 15 and 16, such as to piezoelectrically produce a net voltage at electrode 40; if the polarity of end faces 17 and 20 were not opposed, the net voltage at electrode 40 should be zero since the individual voltages in members 15 and 16 would cancel. When the structure 31 of FIGURE 6 is rotated about an axis normal to the end faces, alternating shear forces acting in the Z axis direction are produced on the members 15 and 16. The voltage appearing at electrode 40, due to these alternating shear forces acting in the Z axis direction, is zero due to the relative polarity of members 15 and 16 with respect to the Z axis. No alternating shear forces are produced by rotation about an axis normal to the major side faces. Accordingly, structure 31 of FIGURE 6 produces a voltage at electrode 40 only in response to rotation about an axis normal to the minor side faces.

The configuration of the structure 31 of FIGURE 6 is such that the forces acting upon the inner members 15 and 16 as discussed above will also act upon the outer members 25 and 26. Hence, outer members 25 and 26 may be used in essentially the same manner as inner members 15 and 16, if their relative polarity is appropriate and electrodes 115 and 116 are connected together to serve in place of electrode 40. It will now be understood that by making use both of inner members 15 and 16 and outer members 25 and 26 and, further, by choosing orientation and relative polarity of all members a structure may be provided such as to produce simultaneously, independent voltages due to respectively rotation about axes normal to the end faces and minor side faces of the structure.

Considering again FIGURE 6, the phase of the voltage produced at electrode 40, by rotation of the structure 31 about an axis normal to the minor side faces, as for example, related to the voltage on electrode 51, depends upon the sense of rotation.

Figure 8:
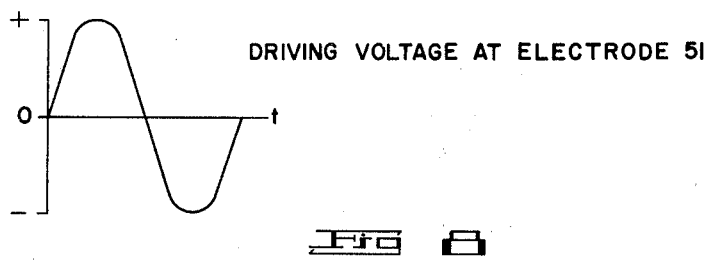
FIGURES 8 through 11 illustrate in relative fashion the voltages on various electrodes.
Figure 9:
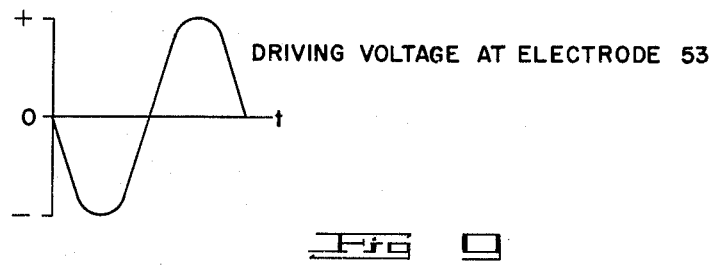
Figure 10:
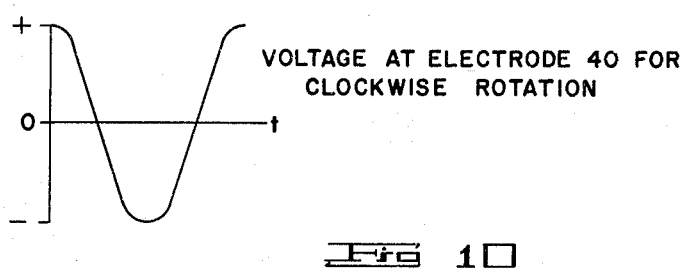
Figure 11:
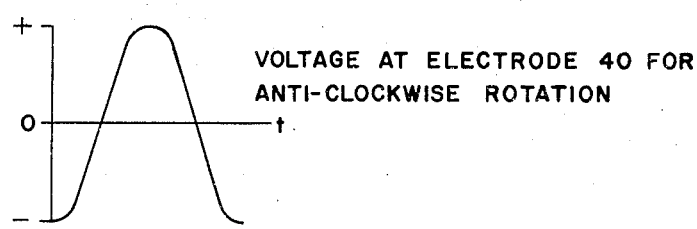

The phase relationship between the various voltages may be seen by reference to FIGURES 8–11. FIGURES 10 and 11 show the alternating voltage at electrode 40 due to the two senses of rotation. FIGURES 8 and 9 show the voltages provided by amplifier 91 at electrodes 51 and 53. It will be seen that the phase of the voltage at electrode 40 is in quadrature with the voltages at electrodes 51 and 52 and further that the two voltages at electrode 40 due to the two senses of rotation are opposed in phase.

It will now be seen that the voltage at electrode 40, produced in response to rotation, is usefully related to the phase of the voltages at electrodes 51 and 53, either of which may be used as a reference voltage. If for clockwise rotation the voltage at electrode 40 leads the voltage at electrode 51, then for anticlockwise rotation the voltage at electrode 40 lags the voltage at electrode 51, there being a 180° phase difference between the two voltages at electrode 40 due to the two senses of rotation. The amplitude of the voltage at electrode 40 is proportional to rate of rotation. Accordingly, in view of the above-described phase relationships and the relationship of the amplitude of the voltage at electrode 40 to rate of rotation, a direct voltage of amplitude proportional to the rate of rotation and of polarity indicating the sense of rotation may be derived from the alternating voltage at electrode 40 by any one of a number of electronic means well known in the art.

Figure 7:
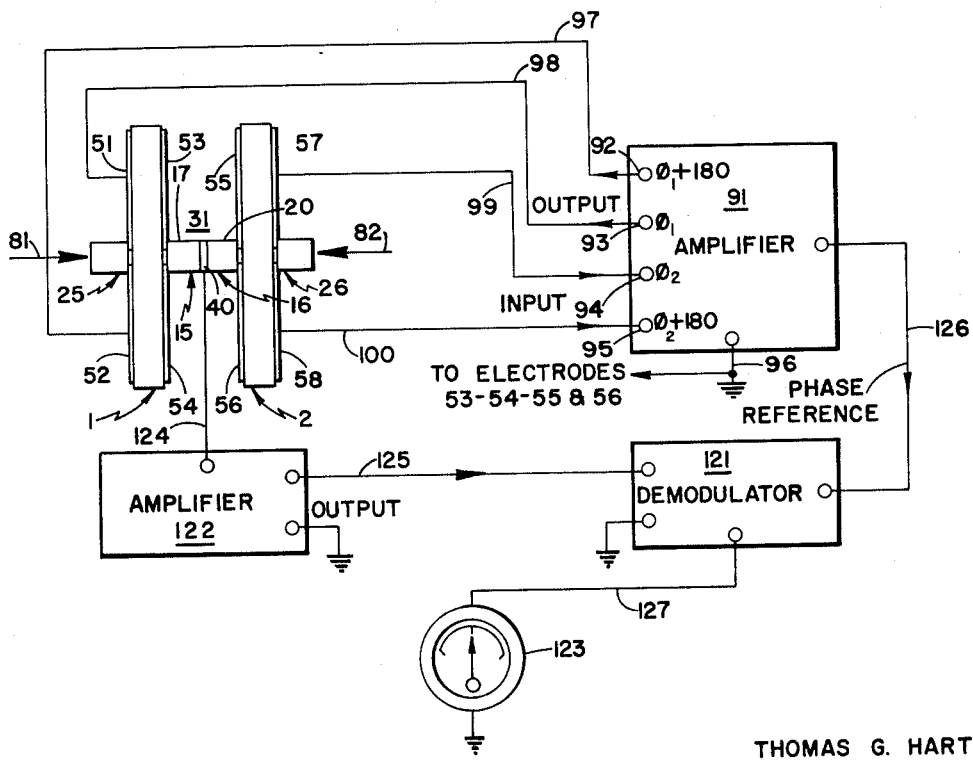
FIGURE 7 shows the structure of FIGURE 6 in combination with means for indicating rate and sense of inertial rotation.
Figure 5:
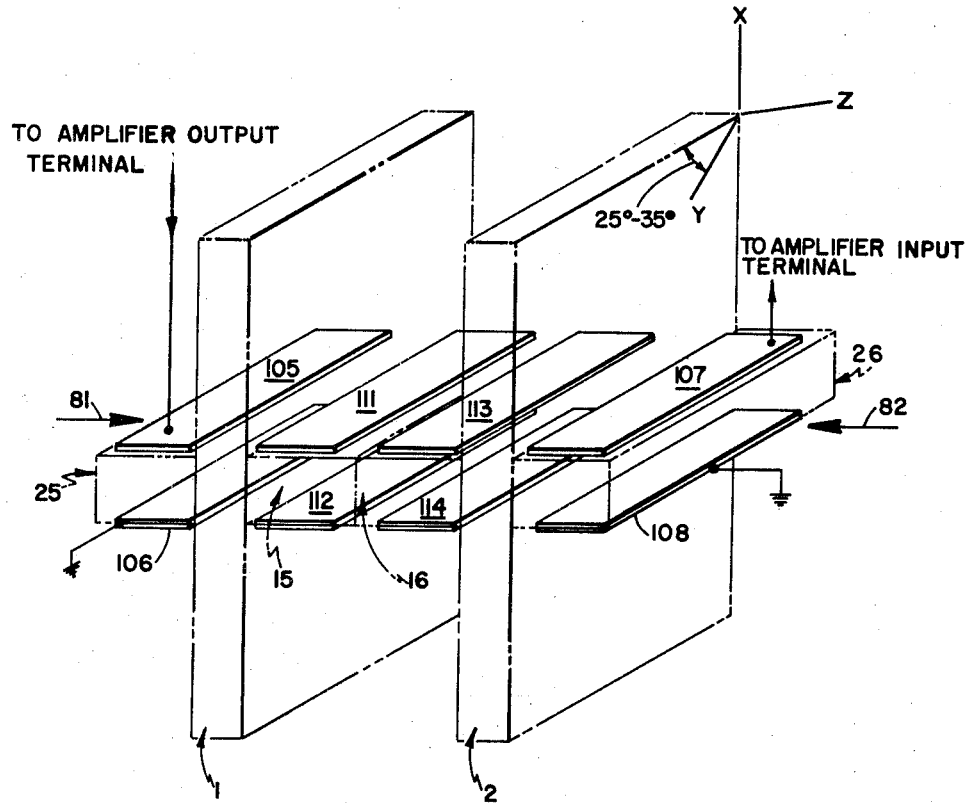

By way of illustration, FIGURE 7 diagrammatically shows a combination of structure 31 of FIGURE 6 and conventional electronic means for measuring both sense and rate of inertial rotation about a single axis.

Typical electronic means which in conjunction with structure 31 of FIGURE 6 may be used to measure inertial rotation is shown in FIGURE 7. A phase-sensitive demodulator 121 is supplied with a phase reference voltage from amplifier 91 and the voltage from electrode 40 amplified by amplifier 122. The output of the phase-sensitive demodulator 121 is a D.C. voltage of magnitude proportional to the rate of rotation and of polarity depending on the sense of rotation and as shown is supplied by way of example to a center-zero dual polarity voltmeter 123.

More particularly, electrode 40 is connected to the input terminal of conventional amplifier 122 via conductor 124. The output signal of amplifier 122 is connected via conductor 125 to one of the input terminals of the phase-sensitive demodulator 121. Coupled to the other input terminal of the phase-sensitive demodulator 121 via conductor 126 is a phase reference voltage from amplifier 91. The phase reference voltage may be derived from either one of the voltages available at the output terminals of amplifier 91. The output of the phase-sensitive demodulator 121 is connected via conductor 127 to the center-zero dual polarity voltmeter 123.

In the event that it is desired to merely indicate or display the magnitude of the voltage at electrode 40, the phase-sensitive demodulator 121 and voltmeter 123 may be omitted, together with the provision of the reference voltage from amplifier 91. The output of amplifier 122 may then be supplied directly to an oscilloscope or the like (not shown).

Generally speaking, the output signal from the phase-sensitive demodulator 121 may be used in all the ways that a similar signal developed from a conventional gyroscope may be used, for example, as a stabilizing signal in a closed loop servo system.

In order to more clearly emphasize the significantly different configuration, construction, and mode of operation of the rotation-sensing embodiments of the present invention, it will be helpful at this point, by way of comparison, to discuss briefly prior art devices for detecting inertial rotation.

At present, inertial rotation is measured almost exclusively by gyroscopes. Essentially, a gyroscope consists of a spinning rotor upon which, in various ways, Coriolis forces due to rotation are allowed to act so as to produce a measure of the rotation.

Rate-gyroscopes sensitive about a single axis are the type most widely used, for example, in stabilizing moving vehicle or for purposes of vehicle guidance and the like. As will be now evident, a rate-gyroscope, although having identical use, is broadly different both in composition and principle of operation from the rotation sensing embodiment of the present invention.

While gyroscopes are the instruments almost universally used in practice for measuring inertial rotation, various vibrational devices have been proposed as alternatives to gyroscopes, for instance, by Lyman and Norden in U.S. Reissue Patent No. 22,409.

In one device of Lyman and Norden a rod is secured at one or both ends and provided with suitable electrical means for sustaining the rod in resonance and for detecting such signals as may be produced by rotation. Generally speaking, prior art vibrational-sensing devices, such as those of Lyman and Norden, are characterized by serious instability problems and have never, so far as is known, matured into practical replacements for gyroscopes. Accordingly, such disadvantages of gyroscopes as may exist have, in aggregate, been less significant practically than the disadvantages of prior art vibrational devices.

A different type of vibrational apparatus for detecting rotation is described in my patent application, Serial No. 770,507, filed October 29, 1958. Apparatus described in my aforesaid application employs standing acoustic waves in various media, wherein upon rotation, Coriolis forces are produced proportional to the rate of rotation. These forces are isolated and measured to serve as a measurement of rotation rate.

Utilized as an inertial rotation-detecting device, the present invention is an improvement over those devices disclosed in my aforementioned application.

By way of example, consider the following specification for a typical instrument, comprising the basic structure 31 and conventional electronics in a single enclosure, suitable for detecting inertial rotation about a single axis:

| | |
|---|---|
| Size | 2½ inches diameter by 2 inches long. |
| Weight | 10 ounces. |
| Input | 28 volts D.C. |
| Output | A D.C. voltage proportional to rate of rotation about a single axis, of polarity depending upon sense of rotation. |
| Sensitivity range | From .01 to 100 radians per second. |
| Sensitivity | 5 volts per radian per second, up to a maximum output of 5 volts, across 600 ohms. |
| Frequency Response | Flat within 1 percent of steady state response from 0–100 cycles per second. |
| Linearity | 0.5 percent over a 100:1 sensitivity range anywhere within the total sensitivity range. |
| Cross-axis sensitivity | Not greater than 0.5 percent of main axis sensitivity. |
| Linear acceleration sensitivity | An output of less than .05 percent of maximum angular output per $g$ along any axis. |
| Warm-up time | Less than 5 seconds. |
| Power consumption | Less than 1.5 watts. |

In summation, an embodiment of the present invention for detecting inertial rotation comprises an intimately connected and symmetrical structure of specially oriented and arranged crystal quartz members. These members comprise constraining means and energy storage means, the energy storage means storing vibrational energy while the constraining means respond to the Coriolis forces acting on the structure when the structure is rotated. The piezoelectric properties of the members equally allow on one hand energy to be directly supplied to the energy storage parts of the structure, and on the other hand allow energy released by inertial rotation to be directly extracted from the constraining parts of the structure. The extreme dimensional stability of crystal quartz and the comparative ease with which it may be worked to exceedingly close dimensional tolerances contribute to the inherent advantages of the present invention over many different prior art rotation sensing devices, especially in terms of stable and reliable performance.

Structure 31 as generally disclosed hitherto may also be used to detect inertial acceleration. For an understanding of the present invention as used for the detection of inertial acceleration, reference will be made to FIGURES 1, 5, and 12.

Figure 12:
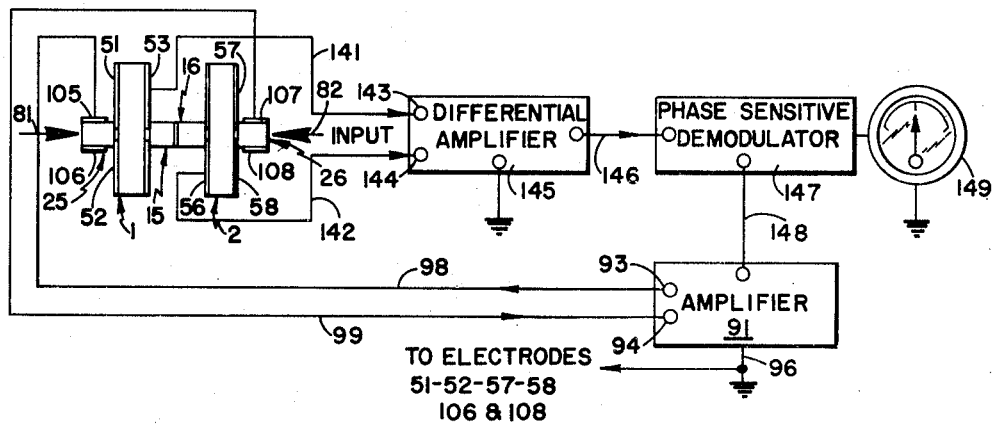
FIGURE 12 shows the structure in combination with means for indicating rate and sense of inertial acceleration.
Figure 13:
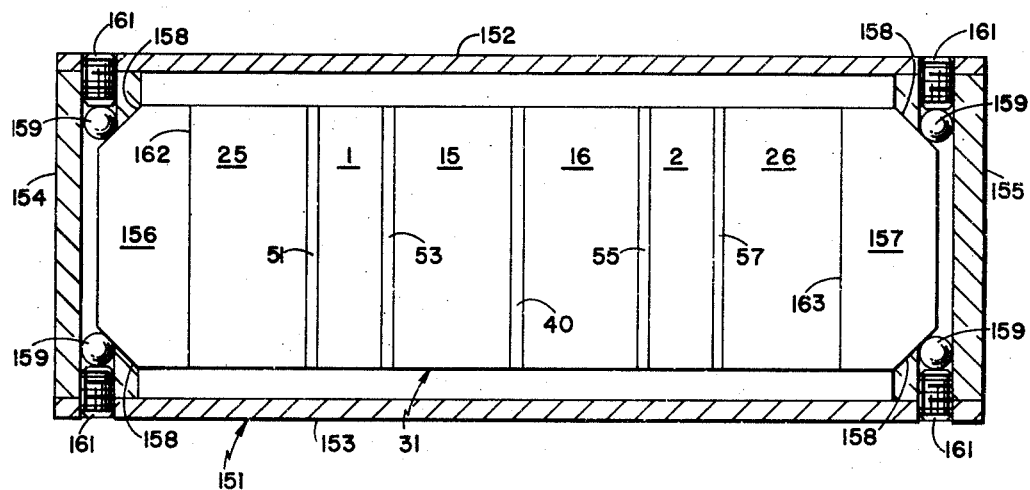
FIGURE 13 is a sectional top view showing a typical arrangement for mounting the structure.

For detecting inertial acceleration, structure 31 as disclosed in FIGURE 1 may be maintained in the fundamental flexural mode as disclosed in FIGURE 12 (an alternative arrangement is shown in FIGURE 5). As disclosed in FIGURE 12, the fundamental flexural mode is maintained by coupling energy into the structure via electrodes disposed on the constraining means; unbalance produced by inertial acceleration in the energy storage members is detected via the electrodes disposed on the energy storage means. Thus, for the detection of inertial acceleration the outer members 25 and 26 or, alternately, the members 15 and 16 (as disclosed in FIGURE 5) are used to maintain the structure 31 in resonance. Electrodes 106 and 108 are connected to the common ground 96 and electrodes 105 and 107 are connected to, respectively, the output terminal 93 and the input terminal 94 of amplifier 91. Not being required, terminal 92 and terminal 95 are not shown. Thus, the output portion of the closed loop for amplifier 91, as shown in FIGURE 12, is comprised of output terminal 93, conductor 98, electrodes 105 and 106, and common ground 96. The input portion is comprised of the input terminal 94, conductor 99, electrodes 107 and 108 and common ground 96. Note that although the arrangement for exciting structure 31 of FIGURE 12 is identical to that of FIGURE 5, other arrangements may be used.

For purposes of detecting inertial acceleration the relative polarity of the crystal quartz members may be arbitrarily chosen. For convenience of electrical connection and as shown in FIGURE 12, the polarities of the energy storage members 1 and 2 are reversed with respect to the X axis.

With reference to FIGURE 12, consider now the connection of electrodes 51–53 and 56–58 on the energy storage members which are used to derive output signals. Electrodes 51, 52 and electrodes 57, 58 are connected to common ground 96, whereas electrode 53 and electrode 56 are connected, respectively, via conductors 141 and 142 to the input terminals 143 and 144 of a conventional differential amplifier 145.

The output of differential amplifier 145 is supplied via conductor 146 to a conventional phase-sensitive demodulator 147 as is a phase reference voltage from amplifier 91 via conductor 148.

The output of the phase-sensitive demodulator 147 is supplied to measuring means represented by a dual polarity, center-zero voltmeter 149. It will be noted that the utilization of the output signals from structure 31 as disclosed in FIGURE 12 is essentially the same as that disclosed in FIGURE 7.

In the absence of acceleration directed along an axis normal to the end faces of structure 31, the resonance energy of the upper portions of the energy storage members 1 and 2 is the same in amount and form as the resonance energy of the lower portions of the energy storage members 1 and 2. Thus, in the absence of acceleration the voltage appearing at electrodes 53 is identical with the voltage appearing at electrode 56.

Upon being subjected to inertial acceleration along an axis normal to the end faces the hitherto balanced resonance of structure 31 is unbalanced, the resonance energy in the upper portions of the energy storage members now being different, in form and amount from the resonance energy in the lower portions of energy storage members, the difference depending upon the magnitude and polarity of the acceleration. This resonance unbalance produces a voltage difference across electrodes 53 and 56 of amplitude proportional to the magnitude of the acceleration and of phase either leading or lagging the phase of the voltage on electrode 53, according to the polarity of acceleration. There is a 180° phase difference between the two voltages due to the two polarities of acceleration. Hence the output voltage of the phase-sensitive demodulator 147 is a D.C. voltage of either positive or negative polarity, depending on the polarity of acceleration, and of amplitude proportional to the rate of acceleration.

In the event that it is desired to merely indicate or display the voltage on conductor 146, it may be connected directly to an oscilloscope (not shown). Further, the output signal from the phase-sensitive demodulator 147 may be used in all the ways that a similar signal developed from a conventional accelerometer and its associated electrical circuitry may be used.

The resonance balance of structure 31 is substantially unaffected by acceleration along axes normal to the side faces. Accordingly, the device is sensitive to only acceleration having a component along a single axis. From the preceding discussion of the inertial motion sensing embodiments, it will be seen that by the provision of suitable orientations of members; of suitable arrangements of relative polarity of the members; and of suitable electrode dispositions and configurations on the faces of the members, structures may be formed, which when used with appropriate electronic circuitry, are capable of measuring either separately or in combination components of rotation about two axes and the component of acceleration along a single axis. Further, it will be evident to those skilled in the art that a plurality of structures of the type disclosed herein can be combined to form a multiple structure unit which in combination with suitable electronic circuitry well known in the art will measure the components of both inertial rotation and acceleration about all three axes.

In describing the various embodiments of structure 31 specific means for mounting the structure have not been discussed. Design features of the mounting means are typically determined as much by external considerations as by the structure itself; for example, the means used for enclosing the whole structure greatly influences the design of the mounting means. However, by way of illustration one arrangement that has been found to be satisfactory is shown in FIGURE 13.

In FIGURE 13 the structure 31 is surrounded by a rigid, rectangular frame, designated generally by the numeral 151. The frame 151 has rigid side pieces 152 and 153 fixedly attached to rigid end pieces 154 and 155. Side pieces 152 and 153 are maintained in spaced relationship with the structure 31. Identical clamping blocks 156 and 157 are movable toward and way from the outermost major side surfaces of members 25 and 26. Portions 158 of the side surfaces of each clamping block are chamfered to provide an angular contact with balls 159 maintained in position by screws 161. Screws 161 permit adjustment of the clamping pressure exerted on structure 31 by blocks 156 and 157.

From the foregoing discussion of several of the possible embodiments of the present invention it will be clearly evident that it may be used for a variety of analogous and nonanalogous uses.

The various features and advantages of the invention disclosed are thought to be clear from the foregoing description. Various other features and advantages not specifically enumerated will undoubtedly occur to those versed in the art, as likewise will many variations and modifications of the embodiments of the invention illustrated herein, all of which may be achieved without departing from the spirit and scope of the invention as defined in the following claims.

I claim:

1. In a mechanical resonance device the combination comprising:
   (a) at least one pair of substantially identical crystal quartz prismatic members having substantially rectangular end faces, said members being disposed in parallel and opposite relationship with respect to equal side faces; and
   (b) crystal quartz constraining means in abutting relationship with said equal side faces substantially equidistant from the ends of said members, the surfaces of said crystal quartz constraining means being oriented with respect to the crystal axes and with respect to said members to substantially match the coefficients of expansion of said constraining means and said members at their abutting surfaces, said prismatic members and said constraining means in combination supporting a resonance condition wherein the unconstrained portions of said members are in substantially balanced flexural motion and said constraining means is subjected to substantially only compressional and extensional forces.

2. The combination as defined in claim 1 wherein said end faces are substantially parallel to the quartz crystal X axis.

3. The combination as defined in claim 1 wherein said end faces are substantially parallel to the quartz crystal Y axis.

4. The combination as defined in claim 1 wherein said end faces are substantially normal to the quartz crystal X axis.

5. In a mechanical resonance device the combination comprising:
   (a) at least one pair of substantially identical crystal quartz prismatic members having rectangular end faces and first and second pairs of side faces, one each of said first pair of side faces being in parallel and opposite relationship; and
   (b) crystal quartz means having faces in abutting relationship with said one each of said first pairs of side faces substantially equidistant from the ends of said members, the faces of said crystal quartz means being oriented with respect to the crystal axes and with respect to said members to substantially match the coefficients of expansion of said crystal quartz means and said members at their abutting surfaces, said prismatic members and said crystal quartz means in combination supporting a resonant vibratory condition wherein the unconstrained portions of said members are in substantially balanced flexural motion and said crystal quartz means is subjected to substantially only compressional and extensional forces.

6. The combination as defined in claim 5 wherein said end faces are substantially parallel to the quartz crystal X axis.

7. The combination as defined in claim 5 wherein said end faces are substantially parallel to the quartz crystal Y axis.

8. The combination as defined in claim 5 wherein said end faces are substantially normal to the quartz crystal X axis.

9. In a mechanical resonance device the combination comprising:
   (a) at least one pair of substantially identical crystal quartz prismatic members having rectangular end faces, said end faces having one dimension greater than their other dimension thereby defining in part major and minor side faces, said members being disposed in parallel and opposite relationship with respect to said major side faces;
   (b) crystal quartz constraining means having substantially faces in abutting relationship with said major side faces substantially equidistant from the ends of said members, the surfaces of said crystal quartz constraining means being oriented with respect to the crystal axes and with respect to said members to substantially match the coefficients of expansion of said constraining means and said members at their abutting surfaces, said prismatic members and said constraining means in combination supporting a resonant vibratory condition wherein the unconstrained portions of said members are in substantially balanced flexural motion and said constraining means is subjected to substantially only compressional and extensional forces; and
   (c) electrode means for piezoelectrically coupling energy into said device to sustain said resonant vibratory condition.

10. The combination as defined in claim 9 wherein said end faces are substantially parallel to the quartz crystal X axis.

11. The combination as defined in claim 9 wherein said end faces are substantially parallel to the quartz crystal Y axis.

12. The combination as defined in claim 9 wherein said end faces are substantially normal to the quartz crystal X axis.

13. The combination as defined in claim 9 wherein said electrode means includes electrodes on at least one of said prismatic members.

14. The combination as defined in claim 9 wherein said electrode means includes electrodes on the constraining means.

15. The combination as defined in claim 9 and including additional electrode means for piezoelectrically coupling resonance energy out of said device.

16. The combination as defined in claim 15 including additional electrode means on said constraining means for piezoelectrically coupling out of said constraining means energy substantially only produced as a consequence of inertial rotation of said device having a component normal to said minor side faces.

17. The combination as defined in claim 15 including additional electrode means on said constraining means for piezoelectrically coupling out of said constraining means energy substantially only produced as a consequence of inertial rotation of said device, said rotation having a component normal to said end faces.

18. The combination as defined in claim 15 including additional electrode means on said prismatic members for piezoelectrically coupling out of said prismatic members energy substantially only produced as a consequence of inertial acceleration of the device, said inertial acceleration having a component normal to said end faces.

19. The combination as defined in claim 16 including additional electrode means on said constraining means for piezoelectrically coupling out of said constraining means energy only produced as a consequence of inertial rotation of said device having a component normal to said end faces.

20. The combination as defined in claim 19 and including additional electrode means on said prismatic members for piezoelectrically coupling out of said prismatic members energy only produced as a consequence of inertial acceleration of the device, said inertial acceleration having a component normal to said end faces.

No references cited.

UNITED STATES PATENT OFFICE
CERTIFICATE OF CORRECTION

Patent No. 3,141,100                          July 14, 1964

Thomas Gordon Hart

It is hereby certified that error appears in the above numbered patent requiring correction and that the said Letters Patent should read as corrected below.

Column 4, lines 22 and 23, after "crystal" insert -- quartz --; column 7, line 9, for "ipnut" read -- input --; column 8, line 39, for "fluxural" read -- flexural --; column 11, line 74, for "electrodes" read -- electrode --; column 14, lines 6 and 7, after "substantially" insert -- equal --.

Signed and sealed this 17th day of November 1964.

(SEAL)
Attest:

ERNEST W. SWIDER
Attesting Officer

EDWARD J. BRENNER
Commissioner of Patents